United States Patent Office 3,066,021
Patented Nov. 27, 1962

3,066,021
COMPOSITION AND METHOD FOR CONTROLLING UNDESIRABLE VEGETATION
David J. Beaver, Richmond Heights, Paul J. Stoffel, St. Louis, and Philip C. Hamm, Webster Groves, Mo., assignors to Monsanto Chemical Company, St. Louis, Mo., a corporation of Delaware
No Drawing. Filed Dec. 29, 1955, Ser. No. 556,049
9 Claims. (Cl. 71—2.6)

This invention relates to new and useful esters and to the process for making same. This invention also relates to herbicidal compositions containing the said new esters.

The new esters of this invention may be represented by the structure

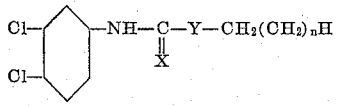

where $n$ is an integer from 0 to 1, and where X and Y are unlike atoms selected from the class consisting of oxygen and sulfur.

As illustrative of the preparation of these new esters of this invention is the following:

Example I

In a suitable reaction vessel is added 12.4 parts by weight of 3,4-dichlorophenyl isothiocyanate and 40.0 parts by weight of methanol. This mixture is refluxed for 12 hours, cooled, and filtered. The solid residue on drying (13.7 parts by weight) is white crystalline methyl 3,4-dichlorothionocarbanilate (M.P. 142.8–143.7° C.).

Replacing methanol in Example I with an equal weight of ethanol there is obtained ethyl 3,4-dichlorothionocarbanilate.

Example II

In a suitable reaction vessel is added 4 parts by weight of methyl 3,4-dichlorothionocarbanilate and 20 parts by weight of methyl iodide. The mixture is refluxed for 18 hours at 45° C. The mass is cooled and the liquid layer evaporated. The yellowish residue is washed with ethanol yielding methyl 3,4-dichlorothiolcarbanilate (M.P. 137.3–138.1° C.).

Replacing methyl 3,4-dichlorothionocarbanilate of Example II with a chemically equivalent amount of ethyl 3,4-dichlorothionocarbanilate, there is obtained ethyl 3,4-dichlorothiolcarbanilate.

As contact herbicides the compounds of this invention exhibit marked selectivity to narrow-leafed plants and to broad-leafed plants other than cotton at the same order of concentration. These new compounds, thusly, may be used very advantageously for ridding cotton fields of invading grasses and broadleafs.

In order to illustrate the unique properties of the compounds of this invention is the following:

Example III

Sray testing of compositions containing the following:

A. isobutyl 3,4-dichlorothionocarbanilate
B. methyl 3,4-dichlorothionocarbanilate
C. methyl 4-chlorothionocarbanilate
D. methyl 3,4-dichlorothiolcarbanilate
E. n-propyl 3,4-dichlorothionocarbanilate was conducted as follows:

Respective acetone solutions of compounds A, B, C, D and E, set forth above, were suspended in water containing a dispersing agent, the quantity of solution employed being calculated to give syrays of the concentration set forth in the table, respectively, of the compound to be tested.

The respective sprays were applied to two-week-old greenhouse flats planted to cotton and containing a variety of other broadleafs and grasses until droplets formed on and/or fell from the foliage and stems of the sprayed plants. The sprayed plants were then allowed to remain under standard conditions of sunlight and watering for a period of ten days. At the end of that time the sprayed plants were compared in order to determine the extent of injury, if any. The following observations were made:

| Compound Tested at Percent Concentration | Extent of Injury on—* | | |
|---|---|---|---|
| | (a) Grass | (b) Broadleafs other than cotton | Cotton |
| Compound A: 0.5% | 0 | 1+ | unaffected. |
| Compound B: 0.2% | 3+ | 3+ | Do. |
| Compound C: 0.2% | 1+ | 3 | injured. |
| Compound D: 0.2% | 4 | 3+ | unaffected. |
| Compound E: 0.2% | 0 | 2 | Do. |

*4=plant dead; 3=severe injury; 2=moderate injury; 1=slight effect; 0=no effect.
(a)=grasses included were wild oat, brome, rye, foxtail and corn.
(b)=broadleafs included were buckwheat, radish, clover, beet, cucumber and moss rose.

Herbicidal compositions containing the present compounds may be aqueous suspensions or oil-in-water emulsions of the compounds, but preferably aqueous suspensions containing a phytotoxic amount of the new herbicidal agent. The aqueous suspension may be obtained simply by dissolving them in effective proportions in a suitable organic solvent and dispersing the solution in water employing a wetting agent. Dispersing or emulsifying agents such as the alkyl aryl sulfonates and the polyethylene glycol derivatives are advantageously employed in the preparation of the herbicidal suspensions or emulsions and a wetting or penetrating agent is desirable for simple aqueous suspensions. The present compounds are preferably applied by spraying aqueous suspensions or oil emulsions of the same, this method affording an easy and inexpensive way of destroying plant growth. For general utility aqueous suspensions in concentrations of 0.01 to 10 parts of the new contact herbicides per 100 parts water may be employed, and in this manner an acre of growing cotton may be freed of undesirable vegetation by application thereto of only a few pounds of the new contact herbicides.

Because of the high herbicidal activity of the present compounds they are advantageously applied by mixing them with inert ingredients as carriers, sometimes referred to in the art as herbicidal adjuvants. Valuable herbicidal compositions are prepared by incorporating small amounts of the compounds into such carriers as water, hydrocarbon oils, organic solvents, dusts such as bentonite, pumice, etc. Sprays may also be prepared by dissolving the chemicals in oils or organic solvents to make concentrates and then adding small amounts of the concentrates to water, advantageously in the presence of an emulsifying or dispersing agent. Emulsions and dispersions thus prepared have the property of adhering to the plant foliage for a long period of time.

What is claimed is:

1. The method of controlling undesirable vegetation which comprises contacting the plant growth with a herbicidal amount of a compound of the structure:

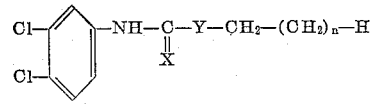

where $n$ is an integer of from 0 to 1 and where X and Y are unlike atoms selected from the group consisting of sulfur and oxygen.

2. The method of ridding cotton fields of undesirable vegetation which comprises contacting the plant growth thereof with a herbicidal amount of a compound of the structure:

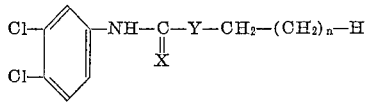

where $n$ is an integer of from 0 to 1 and where X and Y are unlike atoms selected from the group consisting of sulfur and oxygen.

3. The method of claim 2 where the compound is methyl 3,4-dichlorothionocarbanilate.

4. The method of claim 2 wherein the compound is methyl 3,4-dichlorothiolcarbanilate.

5. A herbicidal composition comprising a phytotoxic amount of a compound of the structure

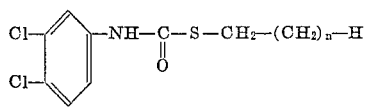

where $n$ is an integer of from 0 to 1, and as a carrier therefor, an aqueous solution of a wetting agent.

6. The herbicidal composition of claim 5 wherein the compound is methyl-3,4-dichlorothiolcarbanilate.

7. A compound of the formula

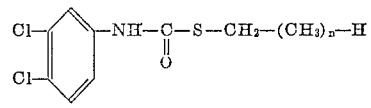

where $n$ is an integer from 0 to 1.

8. Methyl-3,4-dichlorothiolcarbanilate.

9. Ethyl-3,4-dichlorothiolcarbanilate.

References Cited in the file of this patent

UNITED STATES PATENTS

| | | |
|---|---|---|
| 2,617,818 | Mowry | Nov. 11, 1952 |
| 2,650,876 | Stewart | Sept. 1, 1953 |
| 2,863,899 | Harris | Dec. 9, 1958 |

OTHER REFERENCES

Frear: "Catalogue of Insecticides and Fungicides," vol. II, 1948, page 23.

King: U.S. Dept. of Agriculture Handbook 69, May 1954, page 109.

Bost et al.: "Journal of American Chemical Society," vol. 65, January–June 1943, pages 900–1.

Browne et al.: Chemical Society Journal (J. Chem. Soc. (London)) pages 178, 179, part 1, January–June 1934.

Beilsteins Handbuch der organischen Chemie, vol. 12, second supplement 1950, page 335.

Templeman et al. in "Nature," vol. 156, Nov. 24, 1945, page 630.